(12) United States Patent     (10) Patent No.:   US 12,692,919 B2

Sunke            (45) Date of Patent:     Jul. 28, 2026

(54) OPPOSED PISTON TYPE BRAKE ASSEMBLY

(71) Applicant: HL MANDO CORPORATION, Gyeonggi-do (KR)

(72) Inventor: Prakash Sunke, Novi, MI (US)

(73) Assignee: HL MANDO CORPORATION, Gyeonggi-do (KR)

( * ) Notice: Subject to any disclaimer, the term of this patent is extended or adjusted under 35 U.S.C. 154(b) by 422 days.

(21) Appl. No.: 18/212,660

(22) Filed: Jun. 21, 2023

(65) Prior Publication Data

US 2024/0426357 A1     Dec. 26, 2024

(51) Int. Cl.
| | |
|---|---|
| *F16D 55/228* | (2006.01) |
| *F16D 65/18* | (2006.01) |
| *F16D 125/40* | (2012.01) |
| *F16D 125/56* | (2012.01) |

(52) U.S. Cl.
CPC ............ *F16D 65/18* (2013.01); *F16D 55/228* (2013.01); *F16D 2125/40* (2013.01); *F16D 2125/56* (2013.01)

(58) Field of Classification Search
CPC .... F16D 55/228; F16D 65/18; F16D 2121/24; F16D 2125/48; F16D 2125/56
See application file for complete search history.

(56) References Cited

U.S. PATENT DOCUMENTS

| | | | | |
|---|---|---|---|---|
| 6,394,235 | B1 * | 5/2002 | Poertzgen ............. | F16D 55/227 |
| | | | | 303/3 |
| 9,476,470 | B2 * | 10/2016 | Park ...................... | B60T 13/741 |
| 9,528,563 | B2 * | 12/2016 | Balz ........................ | F16D 65/18 |
| 2004/0026181 | A1 * | 2/2004 | Baumgartner .......... | F16D 55/30 |
| | | | | 188/71.7 |
| 2006/0131115 | A1 * | 6/2006 | Han ........................ | F16D 65/18 |
| | | | | 188/72.2 |
| 2009/0294224 | A1 * | 12/2009 | Sakashita .............. | F16D 65/568 |
| | | | | 188/72.2 |
| 2015/0129371 | A1 * | 5/2015 | Gutelius ............... | F16D 55/228 |
| | | | | 188/72.1 |
| 2015/0144438 | A1 * | 5/2015 | Park ........................ | F16D 65/18 |
| | | | | 188/72.1 |

(Continued)

*Primary Examiner* — Bradley T King

(74) *Attorney, Agent, or Firm* — WOMBLE BOND DICKINSON (US) LLP

(57)          ABSTRACT

A brake assembly comprises: an actuator configured to generate a torque; inboard-side and outboard-side piston mechanisms disposed to be opposed to each other to perform a brake operation; an inboard-side drive mechanism configured to transfer the torque generated by the actuator to the inboard-side piston mechanism and a shaft extending from an inboard side to an outboard side of the brake assembly; an outboard-side drive mechanism configured to transfer the torque delivered from the inboard side of the brake assembly through the shaft to the outboard-side piston mechanism; and the shaft extending from the inboard side to the outboard side of the brake assembly to transfer the torque of the inboard-side drive mechanism to the outboard-side drive mechanism, such that the torque generated from the actuator and transferred to the inboard-side drive mechanism is transferable to the outboard-side drive mechanism through the shaft to drive the outboard-side piston mechanism.

4 Claims, 4 Drawing Sheets

(56)     References Cited

U.S. PATENT DOCUMENTS

| | | | |
|---|---|---|---|
| 2015/0354651 A1* | 12/2015 | Park | F16D 55/228 |
| | | | 188/72.1 |
| 2016/0327104 A1* | 11/2016 | Li | F16D 65/0006 |
| 2017/0130788 A1 | 5/2017 | Noguchi et al. | |
| 2017/0314628 A1* | 11/2017 | Kumbhar | F16D 65/18 |
| 2019/0316644 A1 | 10/2019 | Demorais et al. | |
| 2023/0057483 A1* | 2/2023 | Sim | B60T 13/741 |
| 2023/0192058 A1* | 6/2023 | Kim | F16D 65/18 |
| | | | 188/72.8 |
| 2024/0409076 A1* | 12/2024 | Ganzel | B60T 1/065 |
| 2025/0215947 A1* | 7/2025 | He | F16D 55/226 |

* cited by examiner

OPPOSED PISTON TYPE BRAKE ASSEMBLY

CROSS REFERENCE TO RELATED PATENT APPLICATION

This application is related to U.S. patent application Ser. No. 15/953,406, entitled "PISTON BRAKE CALIPER AND BRAKE SYSTEM", filed on Apr. 14, 2018. This application is incorporated herein by reference in its entirety.

TECHNICAL FIELD

Various embodiments of the present disclosure generally relate to brake assemblies for a vehicle and more particularly to a brake assembly having an opposed piston type brake assembly having multiple opposed pistons for applying a braking force to a brake rotor of a vehicle.

BACKGROUND

Most vehicles are equipped with a brake system for slowing or stopping movement of the vehicle in a controlled manner. For example, a brake system for an automobile may include a disc brake assembly for each of the front wheels and either a drum brake assembly or a disc brake assembly for each of the rear wheels. Generally, the brake system may include a service brake assembly and a parking brake assembly. The service brake assembly may be actuated by hydraulic or pneumatic pressure generated when an operator of the vehicle depresses a brake pedal. The parking brake assembly may be used to create a parking brake force to prevent movement of a stopped or parked vehicle.

During a service brake apply in a disc brake system, fluid is pressurized, which causes one or more brake pistons to move one or more brake pads against a brake rotor to create a clamp force. The clamp force functions to decelerate or restrict movement of the vehicle. To release the brake apply and/or to release the clamp force, the fluid is depressurized and, accordingly, the brake pistons and brake pads move away from the brake rotor. Once released, the vehicle is free to move again.

When the vehicle is stopped or parked, the parking brake assembly may be used to prevent movement of the vehicle. The parking brake assembly may utilize one or more components of the service brake assembly. That is, the parking brake assembly may use the piston and the brake pads of the service brake assembly to create the brake apply. For example, the parking brake assembly may move the piston, which may move the brake pads into contact with the rotor to create and maintain a brake apply by clamping force applied to the rotor. Alternatively, the parking brake assembly may be a discrete assembly from the service brake assembly.

It is with respect to these and other general considerations that the following embodiments have been described. Also, although relatively specific problems have been discussed, it should be understood that the embodiments should not be limited to solving the specific problems identified in the background.

SUMMARY

The features and advantages of the present disclosure will be more readily understood and apparent from the following detailed description, which should be read in conjunction with the accompanying drawings, and from the claims which are appended to the end of the detailed description.

According to various embodiments of the present disclosure, a brake assembly may comprise: an actuator configured to generate torque; an inboard-side piston mechanism configured to perform an inboard-side brake operation in association with an inboard-side surface of a brake rotor; an inboard-side drive mechanism operably connected with the actuator and configured to be driven by the torque generated by the actuator to transfer the torque generated by the actuator to the inboard-side piston mechanism and a shaft extending from an inboard side of the brake assembly to an outboard side of the brake assembly; an outboard-side piston mechanism disposed to be opposed to the inboard-side piston mechanism relative to the brake rotor, the outboard-side piston mechanism configured to perform an outboard-side brake operation in association with an outboard-side surface of the brake rotor; an outboard-side drive mechanism configured to transfer the torque, generated by the actuator and transferred through the inboard-side drive mechanism and the shaft extending from the inboard side of the brake assembly to an outboard side of the brake assembly, to the outboard-side piston mechanism; and the shaft extending from the inboard side of the brake assembly to the outboard side of the brake assembly to transfer the torque of the inboard-side drive mechanism to the outboard-side drive mechanism, such that the torque generated from the actuator and transferred to the inboard-side drive mechanism configured to drive the inboard-side piston mechanism is transferable to the outboard-side drive mechanism through the shaft to drive the outboard-side piston mechanism.

The brake rotor may be disposed between the inboard-side of the brake assembly and the outboard-side of the brake assembly.

In first exemplary embodiments of the present disclosure, the inboard-side drive mechanism may comprise one or more gears configured to operably connect between the actuator and the shaft extending from the inboard side of the brake assembly to the outboard side of the brake assembly, and the outboard-side drive mechanism may comprise one or more belts configured to operably connect between the shaft extending from the inboard side of the brake assembly to the outboard side of the brake assembly and the outboard-side piston mechanism to drive the outboard-side piston mechanism.

The shaft extending from the inboard side of the brake assembly to the outboard side of the brake assembly may have a toothed part rotatably engaged with a gear of the inboard-side drive mechanism configured to drive the inboard-side piston mechanism and a pulley part engaged with a belt of the outboard-side drive mechanism configured to drive the outboard-side piston mechanism. The toothed part of the shaft may be a gear fixed to the shaft extending from the inboard side of the brake assembly to the outboard side of the brake assembly. Alternatively, the toothed part of the shaft may be machined on a circumferential surface of the shaft extending from the inboard side of the brake assembly to the outboard side of the brake assembly.

The inboard-side drive mechanism may comprise: a first gear coupled to the inboard-side drive mechanism to transfer the torque generated by the actuator to the inboard-side drive mechanism; and a second gear operably connected with the first gear and coupled to the shaft extending from the inboard side of the brake assembly to the outboard side of the brake assembly to transfer a torque received from the first gear to the shaft extending from the inboard side of the brake assembly to the outboard side of the brake assembly.

The outboard-side drive mechanism may comprise a belt connected between the shaft extending from the inboard side of the brake assembly to the outboard side of the brake assembly and the outboard-side drive mechanism to transfer a torque of the shaft extending from the inboard side of the brake assembly to the outboard side of the brake assembly to the outboard-side drive mechanism.

In second exemplary embodiments of the present disclosure, the inboard-side drive mechanism may comprise one or more belts configured to operably connect between the actuator and the shaft extending from the inboard side of the brake assembly to the outboard side of the brake assembly, and the outboard-side drive mechanism may comprise one or more gears configured to operably connect between the shaft extending from the inboard side of the brake assembly to the outboard side of the brake assembly and the outboard-side piston mechanism to drive the outboard-side piston mechanism.

The shaft extending from the inboard side of the brake assembly to the outboard side of the brake assembly may have a pulley part engaged with a belt of the inboard-side drive mechanism configured to drive the inboard-side piston mechanism and a toothed part rotatably engaged with a gear of the outboard-side drive mechanism configured to drive the outboard-side piston mechanism. The toothed part of the shaft may be a gear fixed to the shaft extending from the inboard side of the brake assembly to the outboard side of the brake assembly. Alternatively, the toothed part of the shaft may be machined on a circumferential surface of the shaft extending from the inboard side of the brake assembly to the outboard side of the brake assembly.

The inboard-side piston mechanism may comprise: an inboard-side rotatable structure operably coupled to the actuator and configured to be rotated by the actuator; an inboard-side linearly movable structure operably coupled to the inboard-side rotatable structure and configured to be linearly moved by rotation of the inboard-side rotatable structure; and an inboard-side piston configured to be linearly movable relative to the inboard-side surface of the brake rotor in response to linear movement of the inboard-side linearly movable structure.

The outboard-side piston mechanism may comprise: an outboard-side rotatable structure operably coupled to the outboard-side drive mechanism and configured to be rotated by the torque generated by the actuator and transferred through the inboard-side drive mechanism, the shaft extending from the inboard side of the brake assembly to an outboard side of the brake assembly, and the outboard-side drive mechanism; an outboard-side linearly movable structure operably coupled to the outboard-side rotatable structure and configured to be linearly moved by rotation of the outboard-side rotatable structure; and an outboard-side piston configured to be linearly movable relative to the outboard-side surface of the brake rotor in response to linear movement of the outboard-side linearly movable structure.

A better understanding of the nature and advantages of the present disclosure may be gained with reference to the detailed description and the drawings below.

BRIEF DESCRIPTION OF THE DRAWINGS

Various embodiments in accordance with the present disclosure will be described with reference to the drawings, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF EMBODIMENTS

In the following detailed description, reference is made to the accompanying drawings which form a part hereof, and in which are shown by way of illustration specific embodiments in which the invention may be practiced. These embodiments are described in sufficient detail to enable those skilled in the art to practice the invention, and it is to be understood that other embodiments may be utilized and that structural, logical and electrical changes may be made without departing from the spirit and scope of the invention. The following detailed description is therefore not to be taken in a limiting sense, and the scope of the invention is defined only by the appended claims and equivalents thereof. Like numbers in the figures refer to like components, which should be apparent from the context of use.

Figure 1:
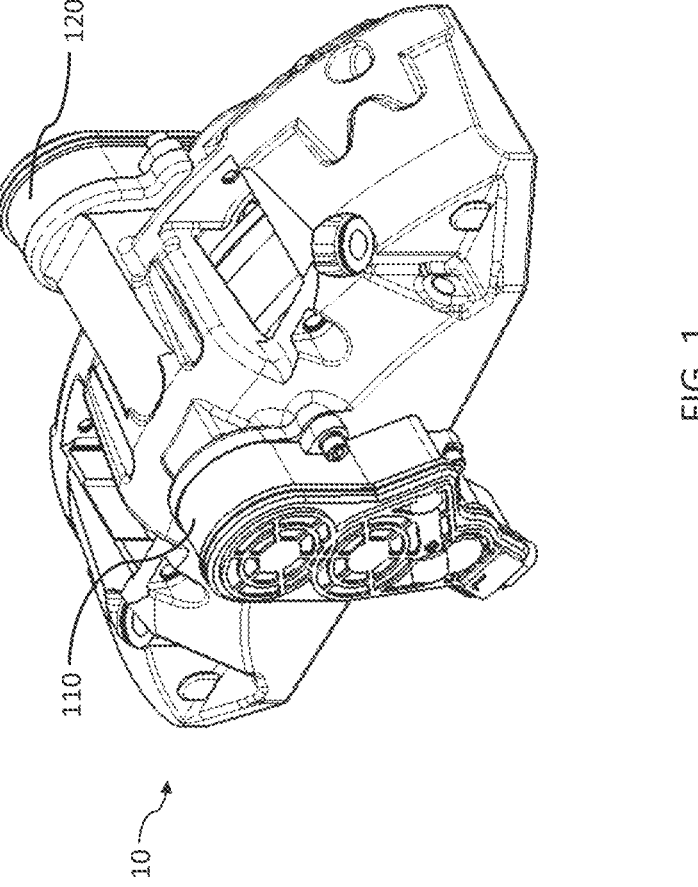
FIG. 1 is an inboard perspective view of a brake assembly according to an embodiment of the present disclosure.
Figure 2:
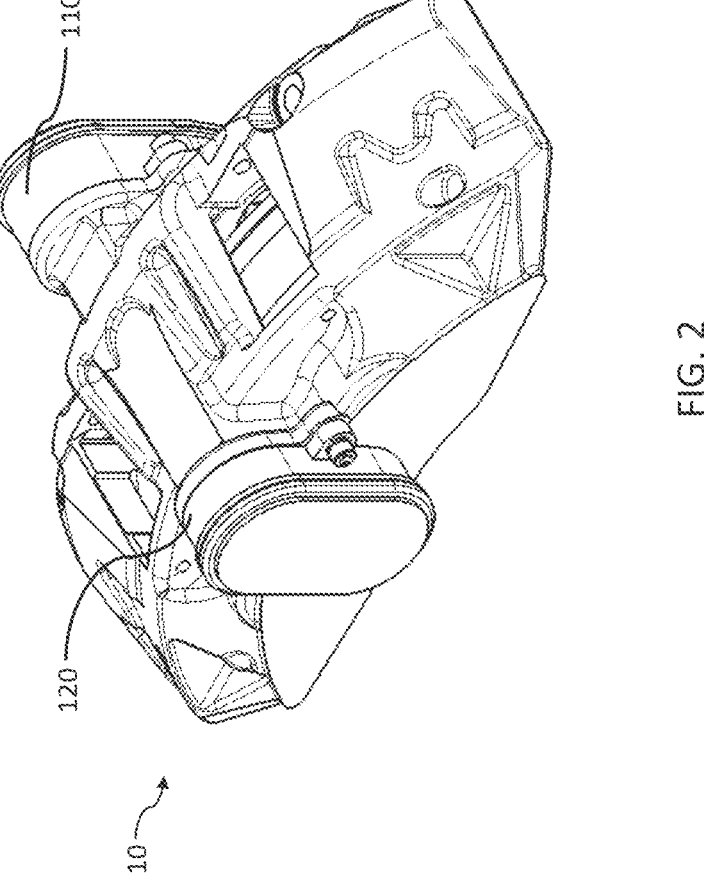
FIG. 2 is an outboard perspective view of a brake assembly according to an embodiment of the present disclosure.
Figure 3:
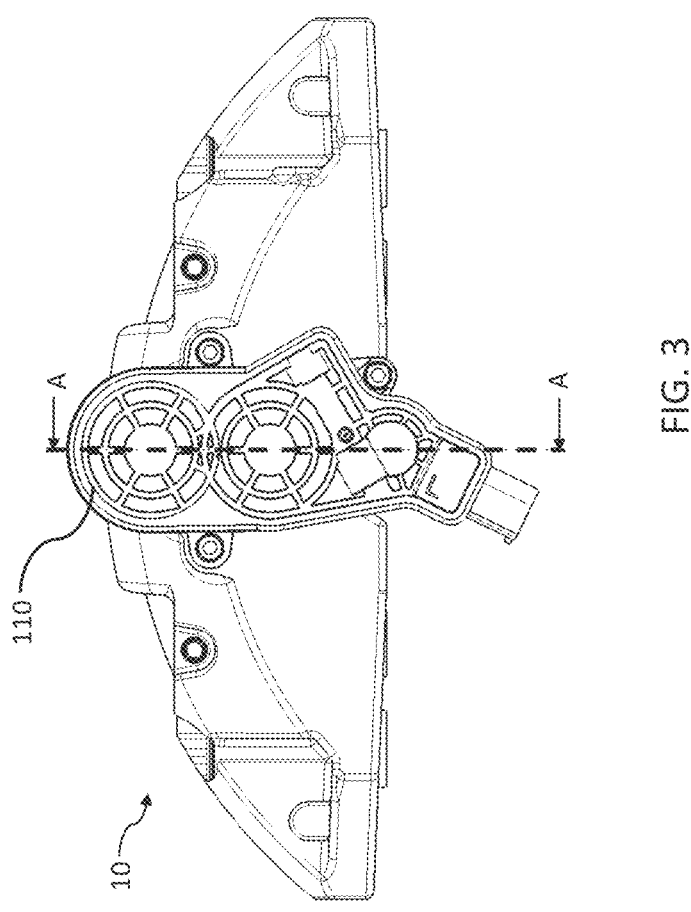
FIG. 3 is an inboard side view of a brake assembly according to an embodiment of the present disclosure.
Figure 4:
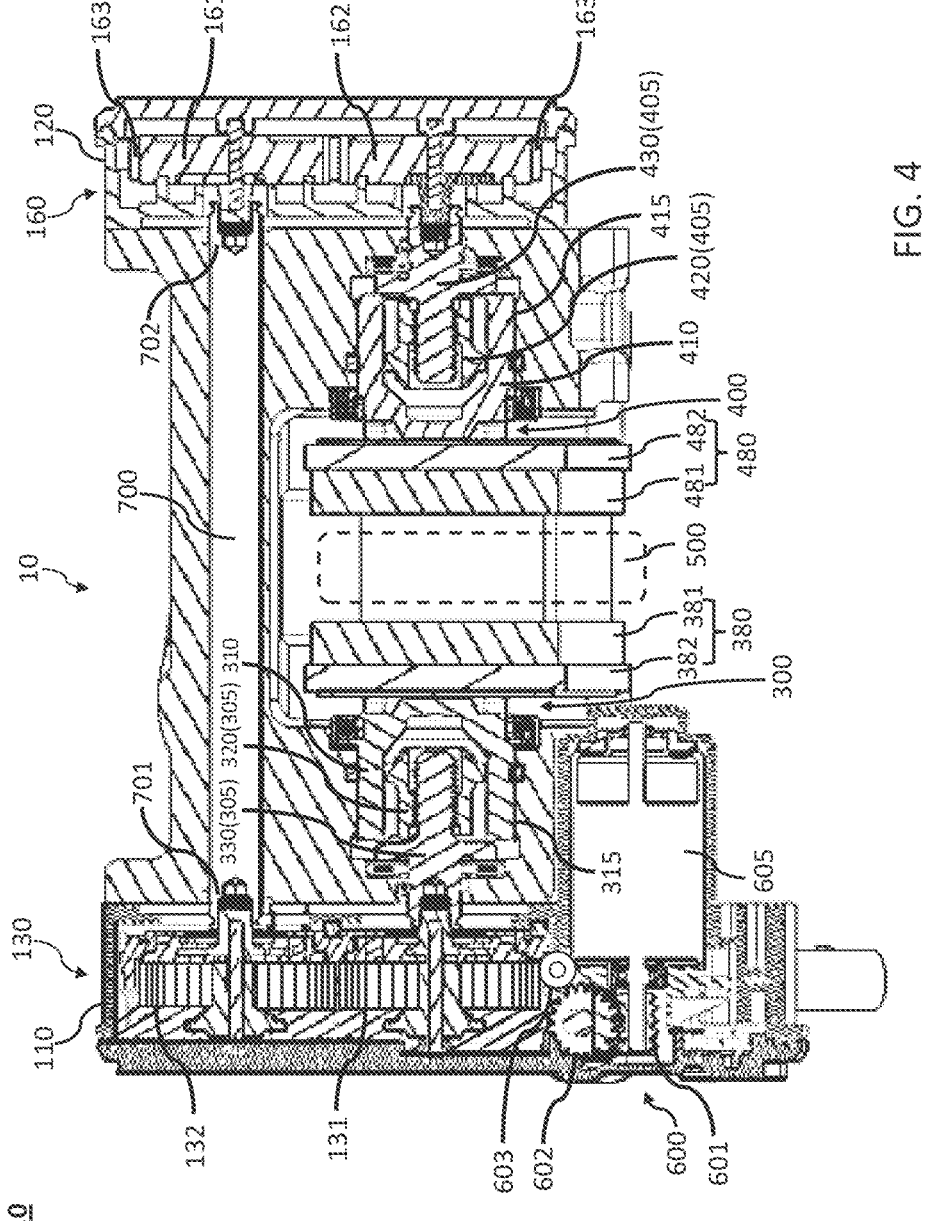
FIG. 4 is a cross-sectional view cut along line A-A of FIG. 3 according to an embodiment of the present disclosure.

FIG. 1 is an inboard perspective view of a brake assembly according to an embodiment of the present disclosure. FIG. 2 is an outboard perspective view of a brake assembly according to an embodiment of the present disclosure. FIG. 3 is an inboard side view of a brake assembly according to an embodiment of the present disclosure. FIG. 4 is a cross-sectional view cut along line A-A of FIG. 3 according to an embodiment of the present disclosure.

A brake assembly 10 comprises a brake caliper 100. For example, the brake assembly 10 may be an opposed piston MoC (Motor on Caliper) type brake assembly. The brake assembly 10 may be mounted to any suitable portion of a vehicle, including frame, body, and trim components.

The brake caliper 100 comprises a first side 110 and a second side 120. For example, the first side 110 may be an inboard side of the brake caliper 100, and the second side 120 may be an outboard side of the brake caliper 100. Alternatively, the first side 110 may be an outboard side of the brake caliper 100, and the second side 120 may be an inboard side of the brake caliper 100. However, for illustration purposes only, the present disclosure refers the first side 100 as the inboard side and refers the second side 120 as the outboard side.

The brake assembly 10 may be an opposed piston type brake assembly having multiple opposed pistons for applying a braking force to a brake rotor of a vehicle. In an exemplary embodiment of the present disclosure, the opposed piston type brake assembly 10 has first and second piston mechanisms 300 and 400. The first piston mechanism 300 is installed at the first side 110 (e.g. an inboard side) of the brake caliper 100, and the second piston mechanism 400 is installed at the second side 120 (e.g. an outboard side) of the brake caliper 100. A first brake pad assembly 380 is operably associated with, or supported by, the first piston mechanism 300 located at the first side 110 of the brake caliper 100, and a second brake pad assembly 480 is operably associated with, or supported by, the second piston mechanism 400 located at the second side 120 of the brake caliper 100. The first and second brake pad assemblies (or brake lining assemblies) 380 and 480 are disposed with a small air clearance on sides of a brake rotor 500, such as a brake disc, in a release position so that no significant residual drag moment occurs. The brake pad assembly 380, 480 is provided in the brake caliper 100, and includes a brake pad or lining 381, 481 and a brake pad (or lining) carrier 382, 482. The brake pad carrier 382, 482 of the brake assembly 380, 480 moves jointly together, and the movement of the brake pad carrier 382, 482 causes the brake pad 382, 482 to move with respect to the brake rotor 500.

The first piston mechanism 300 and the second piston mechanism 400 are arranged to be opposed to each other relative to the brake rotor 500 positioned between the first brake pad assembly 380 and the second brake pad assembly 480. The first piston mechanism 300 and the second piston mechanism 400 may be operated in opposite manners and/or directions to each other for brake apply and release operations.

A first or second brake piston 310 or 410, included in the first or second piston mechanism 300 or 400, respectively, is mounted in a movable manner in a first or second caliper cavity or bore 315 or 415 defined in the brake caliper 100. The caliper cavity or bore 315, 415 can support the brake piston 310, 410 therein. The brake piston 310, 410 may be moved in a brake apply direction, which may function to move the brake pad assembly 380, 480, towards the brake rotor 500 to create the clamping force. The brake piston 310, 410 may be moved in a brake release direction, which may function to allow the brake pad assembly 380, 480 to allow to move away from the brake rotor 500 to release the clamping force.

The first piston mechanism 300 and the second piston mechanism 400 may comprise a first rotary-linear motion conversion mechanism 305 and a second rotary-linear motion conversion mechanism 405. The rotary-linear motion conversion mechanism 305, 405 may be configured to covert rotary motion provided by the actuator assembly 600 into linear motion in order to move the brake piston 310,410 and the brake pad assembly 380, 480 towards or away from the brake rotor 500. The rotary-linear motion conversion mechanism 305, 405 may comprise a linearly movable structure 320, 420 (e.g. a spindle nut) and a rotatable structure 330, 430 (e.g., a spindle).

The linearly movable structure 320, 420 may be received in a housing bore cavity formed by the inner wall of the brake piston 310, 410. The linearly movable structure 320, 420 may be configured to be linearly movable within the housing bore cavity of the brake piston 310, 410. For example, the first linearly movable structure 320 and the second linearly movable structure 420 may be operably coupled with a first rotatable structure 330 and a second rotatable structure 430, and the first linearly movable structure 320 and the second linearly movable structure 420 are linearly movable in response to rotation of the first rotatable structure 330 and the second rotatable structure 430. The linearly movable structure 320, 420 and the rotatable structure 330, 430 may be configured to transfer a power output from the actuator assembly 600 into a linear or axial force to move the brake piston 310, 410 along an axis of the caliper cavity 315, 415.

In an exemplary embodiment of the present disclosure, the linearly movable structure 320, 420 may include a spindle nut, and the rotatable structure 330, 430 may comprise a spindle. The linearly movable structure 320, 420 and the rotatable structure 330, 430 may be operatably coupled by a threaded portion, a ball screw, a roller screw, a ball ramp, or any coupling structure or mechanism that can change the rotation movement to the linear movement.

The linearly movable structure 320, 420 (e.g. a spindle nut) can move axially either towards or away from the brake rotor 500. The direction that the linearly movable structure 320, 420 (e.g. a spindle nut) is moved depends on the direction that the rotatable structure 330, 430 (e.g. a spindle) rotates. During a brake apply, the rotatable structure 330, 430 (e.g. a spindle) is rotated in an apply direction by the actuator assembly 600 so that the linearly movable structure 320, 420 (e.g. a spindle nut) is moved in a direction towards the brake rotor 500. During a brake release, the rotatable structure 330, 430 (e.g. a spindle) is rotated in an opposing release direction by the actuator assembly 600 so that the linearly movable structure 320, 420 (e.g. a spindle nut) is moved in a direction away from the brake rotor 500.

For example, the linearly movable structure 320, 420 (e.g. a spindle nut) may threadably engage the rotatable structure 330, 430 (e.g. a spindle). For example, an outer surface of the rotatable structure 330, 430 (e.g. a spindle) may have a threaded portion and an inner surface of the linearly movable structure 320, 420 (e.g. a spindle nut) may have a threaded portion that is configured to threadably engage the threaded portion of the rotatable structure 330, 430 (e.g. a spindle). Alternatively, the first or second linearly movable structure 320 or 420 (e.g. a spindle nut) and the first or second rotatable structure 330 or 430 (e.g. a spindle) may be coupled to each other via a ball screw or nut, a roller screw, a ball ramp, or any rotary to linear mechanism configured to convert a rotary movement into a linear movement.

The linearly movable structure 320, 420 (e.g. a spindle nut) is restricted or prevented from rotating about an axis of the rotatable structure 330, 430 (e.g. a spindle), or about a spindle itself. The linearly movable structure 320, 420 (e.g. a spindle nut) is keyed to the housing bore cavity 315, 415 formed by the inner wall of the brake piston 310, 410 to prevent the linearly movable structure 320, 420 (e.g. a spindle nut) from rotating about the rotatable structure 330, 430 (e.g. a spindle) or the spindle axis.

The actuator assembly 600 may be configured to generate a drive torque for the brake assembly 10. The actuator assembly 600 may include an actuator 605, for example, but not limited to, a motor. The actuator assembly 600 may be installed at the inboard side 110 of the brake caliper 100. Alternatively, the actuator assembly 600 may be mounted at the outboard side 120 of the brake caliper 100, or the outside of the brake caliper 100, or at any location which can transfer the drive torque to a first drive mechanism 130, such as an inboard-side drive mechanism.

The motor 605 of the actuator assembly 600 may be directly or indirectly coupled to the first drive mechanism 130. For instance, the motor 605 of the actuator assembly 600 may be operably coupled to the first drive mechanism 130 through one or more gears and/or belts. In the embodiment illustrated in FIG. 4, the motor 605 of the actuator assembly 600 can transfer the drive torque to the first drive mechanism 130 through a set of one or more spur gears and one or more worm gears. For instance, a worm gear 601 provided on the shaft of the motor 605 of the actuator assembly 600 is in contact with and engages a spur gear 602, and the spur gear 602 rotatably engages or meshes with a worm gear 603 which rotatably engages, or meshes with, one of gears of the first drive mechanism 130. However, instead of the gears 601 to 604 shown in FIG. 4, any type of gears and/or a belt mechanism which can transmits the drive torque from the motor 605 of the actuator assembly 600 to the first drive mechanism 130 can be used, or the motor 605 of the actuator assembly 600 can be directly coupled to the first drive mechanism 130.

The first drive mechanism 130 included in the inboard side 110 of the brake caliper 100 (hereinafter an "inboard-side drive mechanism") may be configured to receive the drive torque generated by the actuator assembly 600, drive the inboard-side rotary-linear motion conversion mechanism 305 by the drive torque received from the actuator assembly 600, and transfer the drive torque received from the actuator assembly 600 to a shaft 700 extending from the inboard side 110 to the outboard side 120 of the brake caliper 100.

The inboard-side drive mechanism 130 may include a gear assembly comprising one or more gears. A first gear 131 of the inboard-side drive mechanism 130 may be fixedly coupled to one of components of the inboard-side rotary-linear motion conversion mechanism 305 to be rotatable together with the inboard-side rotatable structure 330 (e.g. a spindle) of the inboard-side rotary-linear motion conversion mechanism 305. For instance, the first gear 131 of the inboard-side drive mechanism 130 rotatably engaged with the gear 603 of the actuator assembly 600 may be fixed to the inboard-side rotatable structure 330 of the inboard-side rotary-linear motion conversion mechanism 305. Alternatively, the first gear 131 of the inboard-side drive mechanism 130 and the inboard-side rotatable structure 330 (e.g. a spindle) of the inboard-side rotary-linear motion conversion mechanism 305 may be formed as a single integrated piece.

In response to the drive torque received from the actuator assembly 600, the first gear 131 of the inboard-side drive mechanism 130 is rotated, then the rotation of the first gear 131 cause the inboard-side rotatable structure 330 fixed to the first gear 131 to be rotated, and in turn the inboard-side linearly movable structure 320 (e.g. a spindle nut), the inboard-side brake piston 310 and the inboard-side brake pad assembly 380 are linearly moved relative to the brake rotor 500 as described above.

In addition, the first gear 131 of the inboard-side drive mechanism 130 can transfer the drive torque received from the actuator assembly 600 to the shaft 700 extending from the inboard side 110 to the outboard side 120 of the brake caliper 100 so that the torque generated by the actuator assembly 600 at the first side 110 (e.g. an inboard side) of the brake caliper 100 can be provided to the second side 120 (e.g. an outboard side) of the brake caliper 100 through the shaft 700 extending from the inboard side 110 to the outboard side 120 of the brake caliper 100. For example, the rotation of the first gear 131 of the inboard-side drive mechanism 130 by the torque generated by the actuator assembly 600 located at the inboard side 110 may cause the shaft 700 to rotate, and the rotary torque of the shaft 700 of the inboard side 110 to the outboard side 120 of the brake caliper 100 is transferred to an outboard-side drive mechanism 160.

A second gear 132 may be mounted on the shaft 700 extending from the inboard side 110 to the outboard side 120 of the brake caliper 100. The second gear 132 fixed to the shaft 700 may be rotatably engaged with the first gear 131 of the inboard-side drive mechanism 130 so that the rotary movement of the first gear 131 of the inboard-side drive mechanism 130 can rotate the second gear 132 as well as the shaft 700. Alternatively, instead of the second gear 132, teeth can be directly formed on an outer surface of the shaft 700 to be in contact with and rotatably engaged with the first gear 131 of the inboard-side drive mechanism 130.

The shaft 700 extends from the inboard side 110 to the outboard side 120 of the brake caliper 100 to deliver the torque, generated at the inboard side 110, to the outboard side 120 by the rotary movement of the shaft 700. The shaft 700 may be rotatably disposed in a bridge bore of a bridge of the brake caliper 100 connecting between the inboard side 110 and the outboard side 120 of the brake caliper 100. An inboard-side shaft portion 701 such as one end of the shaft 700, may be operably connected with, or in communication with, the inboard-side drive mechanism 130, or the actuator assembly 600, and an outboard-side shaft portion 702, such as the other end of the shaft 700, may be operably connected with, or in communication with, the outboard-side drive mechanism 160. For example, the inboard-side shaft portion 701 is fixedly coupled to the second gear 132 which rotatably engages the first gear 131 of the inboard-side drive mechanism 130. Alternatively, the inboard-side shaft portion 701 or the second gear 132 fixed to the shaft 700 may be directly coupled to the actuator assembly 600 by locating the actuator assembly 600 between the inboard-side drive mechanism 130 and the shaft 700 so that the torque generated by the actuator assembly 600 can be directly transferred to the shaft 700 not through the inboard-side drive mechanism 130.

The outboard-side shaft portion 702 of the shaft 700 may be operably connected to the outboard-side drive mechanism 160 (e.g. a gear unit) in order to drive the outboard-side piston mechanism 400 by transferring the torque at the inboard side 110 to the outboard-side piston mechanism 400 through the shaft 700 and the outboard-side drive mechanism 160.

In the exemplary embodiment illustrated in FIG. 4, the outboard-side drive mechanism 160 may include a belt assembly. For example, the outboard-side drive mechanism 160 may comprise a drive pulley 161, a driven pulley 162, and a drive belt 163. The drive pulley 161 coupled to the shaft 700 and the driven pulley 162 coupled to the outboard-side piston mechanism 400 are rotatably connected to each other via the drive belt 163 so that the rotary torque of the shaft 700 can be delivered to the outboard-side piston mechanism 400 via the belt assembly of the outboard-side drive mechanism 160. Each of the drive pulley 161 and the driven pulley 162 has an outer surface that engages an inner surface of the drive belt 163. The outer surfaces of the drive pulley 161 and the driven pulley 162 may have any suitable contour or texture to help ensure a gripping contact between the drive belt 163 and the pulley 161, 162. For example, the outer surface of the pulley 161, 162 and the inner surface of the drive belt 163 can include toothed mating protruding and/or notches formed therein.

The drive belt 163 is fit relatively snugly about the outer circumferences of the drive pulley 161 and the driven pulley 162. Thus, the rotational movement of the drive pulley 161 caused by the rotation of the shaft 700 extending from the inboard side 110 to the outboard side 120 of the brake caliper 100 causes the rotation of the driven pulley 162 through the drive belt 163. The diameters of the pulleys 161 and 162 can be any suitable dimension for providing any desired gear ratio. The drive belt 163 may be made from any suitable material or combination of materials flexible enough to loop around the drive pulley 161 and the driven pulley 162 and maintain engagement with the outer surfaces of the drive pulley 161 and the driven pulley 162 during rotation thereof. The drive belt 163 may be, for example, but not limited to, a vee belt or a cog belt, or may be made of individual links forming a chain. The drive belt 163 may be made of an elastomeric material, and may include internal metallic reinforcing members.

The drive pulley 161 of the outboard-side drive mechanism 160 may be attached to, or directly formed on, the outboard-side shaft portion 702 of the shaft 700. The drive pulley 161 may be mounted to and pressed in the outboard-side shaft portion 702 as a separate piece from the outboard-side shaft portion 702, or may be directly machined on the circumferential surface of the outboard-side shaft portion 702 of the shaft 700 to be coupled with the drive belt 163.

The driven pulley 162 of the outboard-side drive mechanism 160 may be fixedly coupled to one of components of the outboard-side rotary-linear motion conversion mechanism 405 to be rotatable together with the outboard-side rotatable structure 430 (e.g. a spindle) of the outboard-side rotary-linear motion conversion mechanism 405. For instance, the driven pulley 162 of the outboard-side drive mechanism 160 rotatably connected with the drive pulley 161 of the outboard-side drive mechanism 160 via the drive belt 163 may be fixed to the outboard-side rotatable structure 430 (e.g. a spindle) of the outboard-side rotary-linear motion conversion mechanism 405. Alternatively, the driven pulley 162 of the outboard-side drive mechanism 160 and the outboard-side rotatable structure 430 (e.g. a spindle) of the outboard-side rotary-linear motion conversion mechanism 405 may be formed as a single integrated piece.

In response to the torque received through the shaft 700 from the inboard side 110, the drive pulley 161 provided at the outboard-side shaft portion 702 of the shaft 700 is rotated, then the driven pulley 162 of the outboard-side drive mechanism 160 is rotated by the drive belt 163 coupled to the drive pulley 161, thereby rotating the outboard-side rotatable structure 430 fixed to the driven pulley 162 of the outboard-side drive mechanism 160, and in turn the outboard-side linearly movable structure 420 (e.g. a spindle nut), the outboard-side brake piston 410 and the outboard-side brake pad assembly 480 are linearly moved relative to the brake rotor 500 as described above.

Although the inboard-side drive mechanism 130 has a gear assembly having one or more gears and the outboard-side drive mechanism 160 has a belt assembly having one or more belts in the exemplary embodiment shown in FIG. 4, the inboard-side drive mechanism 130 can have the belt assembly described above and the outboard-side drive mechanism 160 can have the gear assembly described above. Alternatively, both the inboard-side drive mechanism 130 and the outboard-side drive mechanism 160 can have one of a gear assembly and a belt assembly with minor modification to the exemplary embodiment of FIG. 4, for example, but not limited to, adding one more gear between the first gear and the second gear to change a rotary direction of the second gear.

Operation of brake of the brake assembly 10 will now be described. It is understood that these operations or method steps can be performed in virtually any order, and one or more of the operations or steps described herein may be changed, combined, omitted or repeated.

For activating or releasing the brake of the brake assembly 10, the actuator assembly 600 disposed at the inboard side 110 of the brake caliper 100 provides a rotary torque to the first gear 131 of the inboard-side drive mechanism 130 through one or more gears, such as the worm or spur gears 601 to 603.

The rotation force to the first gear 131 of the inboard-side drive mechanism 130 fixedly coupled to the inboard-side rotatable structure 330 of the rotary-linear motion conversion mechanism 305 causes the inboard-side rotatable structure 330 to rotate, thereby linearly moving the inboard-side linearly movable structure 320 of the inboard-side rotary-linear motion conversion mechanism 305 and then, for a brake apply, pushing the inboard-side brake piston 310 so that the inboard-side brake piston 310 presses the inboard-side brake pad assembly 380 towards the brake rotor 500 to apply the clamping force of the inboard-side brake pad assembly 380 to the brake rotor 500, or, for a brake release, moving the inboard-side brake piston 310 in the inboard direction so that the inboard-side brake pad assembly 380 can be free to relax and move away from the brake rotor 500 to release the clamping force of the inboard-side brake pad assembly 380 against the brake rotor 500.

At the same time as when the first gear 131 of the inboard-side drive mechanism 130 rotates the inboard-side rotatable structure 330 of the rotary-linear motion conversion mechanism 305, the rotary movement of the first gear 131 of the inboard-side drive mechanism 130 also causes the second gear 132, provided at the inboard-side shaft portion 701 of the shaft 700 extending from the inboard side 110 to the outboard side 120 of the brake caliper 100, to rotate, thereby to rotate the shaft 700.

The rotation of the shaft 700 can transmit the torque generated at the inboard side 110 of the brake caliper 100 to the outboard side 120 of the brake caliper 100. Specifically, the rotary movement of the shaft 700 causes the drive pulley 161 of the outboard-side drive mechanism 160 provided at the outboard-side shaft portion 702 of the shaft 700 to rotate, and in turn the driven pulley 162 of the outboard-side drive mechanism 160 is rotated by the drive belt 163 connecting between the drive pulley 161 and the driven pulley 162 of the outboard-side drive mechanism 160.

The rotation force to the driven pulley 162 of the outboard-side drive mechanism 160 fixedly coupled to the outboard-side rotatable structure 430 of the outboard-side rotary-linear motion conversion mechanism 405 causes the outboard-side rotatable structure 430 to rotate, thereby linearly moving the outboard-side linearly movable structure 420 of the outboard-side rotary-linear motion conversion mechanism 405 and then, for a brake apply, pushing the outboard-side brake piston 410 so that the outboard-side brake piston 410 presses the outboard-side brake pad assembly 480 towards the brake rotor 500 to apply the clamping force of the outboard-side brake pad assembly 480 to the brake rotor 500, or, for a brake release, moving the outboard-side brake piston 410 in the outboard direction so that the outboard-side brake pad assembly 480 can be free to relax and move away from the brake rotor 500 to release the clamping force of the outboard-side brake pad assembly 480 against the brake rotor 500.

Accordingly, one single actuator assembly 600 located at one side 110 of the brake caliper 100 can move multiple brake pistons 310 and 410 located at opposing sides 110 and 120 of the brake caliper 100 to apply or release the clamping force to or from the brake rotor 500. The brake assembly 10 having the shaft 700 extending from the inboard side 110 to the outboard side 120 of the brake caliper 100 can provide sufficient force to provide brake at opposing sides of the brake rotor 500. Additionally, the brake assembly 10 according to some embodiments of the present disclosure can provide greater brake force in a smaller package and have a simpler structure than a conventional brake assembly. Further, the brake assembly 10 according to certain embodiments of the present disclosure can increase the efficiency of brake operation of the brake assembly 10.

Although the example embodiments have been described in detail, it should be understood that various changes, substitutions and alterations can be made herein without departing from the spirit and scope of the present disclosure as defined by the appended claims.

Moreover, the scope of the present application is not intended to be limited to the particular embodiments of the process, machine, manufacture, and composition of matter, means, methods and steps described in the specification. As one of ordinary skill in the art will readily appreciate from the disclosure, processes, machines, manufacture, compositions of matter, means, methods or steps, presently existing or later to be developed, that perform substantially the same function or achieve substantially the same result as the corresponding embodiments described herein may be utilized according to the embodiments and alternative embodiments. Accordingly, the appended claims are intended to include within their scope such processes, machines, manufacture, compositions of matter, means, methods, or steps.

The explanations and illustrations presented herein are intended to acquaint others skilled in the art with the invention, its principles, and its practical application. The above description is intended to be illustrative and not restrictive. Those skilled in the art may adapt and apply the invention in its numerous forms, as may be best suited to the requirements of a particular use.

Accordingly, the specific embodiments of the present invention as set forth are not intended as being exhaustive or limiting of the teachings. The scope of the teachings should, therefore, be determined not with reference to this description, but should instead be determined with reference to the appended claims, along with the full scope of equivalents to which such claims are entitled. The omission in the following claims of any aspect of subject matter that is disclosed herein is not a disclaimer of such subject matter, nor should it be regarded that the inventors did not consider such subject matter to be part of the disclosed inventive subject matter.

Plural elements or steps can be provided by a single integrated element or step. Alternatively, a single element or step might be divided into separate plural elements or steps.

The disclosure of "a" or "one" to describe an element or step is not intended to foreclose additional elements or steps.

While the terms first, second, third, etc., may be used herein to describe various elements, components, regions, layers and/or sections, these elements, components, regions, layers and/or sections should not be limited by these terms. These terms may be used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A brake assembly comprising:
an actuator configured to generate torque;
an inboard-side piston mechanism disposed on an inboard-side of a brake caliper and configured to perform an inboard-side brake operation in association with an inboard-side surface of a brake rotor;
an inboard-side drive mechanism operably connected with the actuator and configured to be driven by the torque generated by the actuator to transfer the torque generated by the actuator to the inboard-side piston mechanism and a shaft extending from an inboard side of the brake assembly to an outboard side of the brake assembly;
an outboard-side piston mechanism disposed on an outboard-side of the brake caliper and opposed to the inboard-side piston mechanism relative to the brake rotor, the outboard-side piston mechanism configured to perform an outboard-side brake operation in association with an outboard-side surface of the brake rotor;
an outboard-side drive mechanism configured to transfer the torque, generated by the actuator and transferred through the inboard-side drive mechanism and the shaft extending from the inboard side of the brake assembly to an outboard side of the brake assembly, to the outboard-side piston mechanism; and
the shaft extending from the inboard side of the brake assembly to the outboard side of the brake assembly to transfer the torque of the inboard-side drive mechanism to the outboard-side drive mechanism, such that the torque generated from the actuator and transferred to the inboard-side drive mechanism configured to drive the inboard-side piston mechanism is transferable to the outboard-side drive mechanism through the shaft to drive the outboard-side piston mechanism,
wherein the inboard-side drive mechanism comprises:
a first gear coupled to the inboard-side drive mechanism to transfer the torque generated by the actuator to the inboard-side drive mechanism; and
a second gear operably connected with the first gear and coupled to the shaft extending from the inboard side of the brake assembly to the outboard side of the brake assembly to transfer a torque received from the first gear to the shaft extending from the inboard side of the brake assembly to the outboard side of the brake assembly,
wherein the outboard-side drive mechanism comprises a belt connected between the shaft extending from the inboard side of the brake assembly to the outboard side of the brake assembly and the outboard-side drive mechanism to transfer a torque of the shaft extending from the inboard side of the brake assembly to the outboard side of the brake assembly to the outboard-side drive mechanism.

2. The brake assembly according to claim 1, wherein the brake rotor is disposed between the inboard-side of the brake assembly and the outboard-side of the brake assembly.

3. The brake assembly according to claim 1, wherein the inboard-side piston mechanism comprises:
an inboard-side rotatable structure operably coupled to the actuator and configured to be rotated by the actuator;
an inboard-side linearly movable structure operably coupled to the inboard-side rotatable structure and configured to be linearly moved by rotation of the inboard-side rotatable structure; and
an inboard-side piston configured to be linearly movable relative to the inboard-side surface of the brake rotor in response to linear movement of the inboard-side linearly movable structure.

4. The brake assembly according to claim 1, wherein the outboard-side piston mechanism comprises:

an outboard-side rotatable structure operably coupled to the outboard-side drive mechanism and configured to be rotated by the torque generated by the actuator and transferred through the inboard-side drive mechanism, the shaft extending from the inboard side of the brake assembly to an outboard side of the brake assembly, and the outboard-side drive mechanism;

an outboard-side linearly movable structure operably coupled to the outboard-side rotatable structure and configured to be linearly moved by rotation of the outboard-side rotatable structure; and an outboard-side piston configured to be linearly movable relative to the outboard-side surface of the brake rotor in response to linear movement of the outboard-side linearly movable structure.

\* \* \* \* \*